United States Patent [19]
Lietzow et al.

[11] Patent Number: 5,198,798
[45] Date of Patent: Mar. 30, 1993

[54] WIRELESS TAILLIGHT SYSTEM

[76] Inventors: Larry Lietzow, 4713 Walnut St., Mantua, Ohio 44255; Anthony Dechiara, 8833 Indian Hills Cr., Canal Fulton, Ohio 44614

[21] Appl. No.: 844,514

[22] Filed: Mar. 2, 1992

[51] Int. Cl.⁵ ............................ G08B 1/08; B60Q 1/26
[52] U.S. Cl. .................................... 340/539; 340/468; 340/463; 340/465; 340/475; 340/825.69
[58] Field of Search ............... 340/539, 686, 687, 431, 340/468, 472, 474, 475, 825.69, 825.72, 463, 464, 473, 465

[56] References Cited

U.S. PATENT DOCUMENTS

| | | | |
|---|---|---|---|
| 2,753,640 | 7/1956 | McConnell | 40/132 |
| 2,813,265 | 11/1957 | Finks | 340/366 |
| 2,843,952 | 7/1958 | Zgraggen | 40/52 |
| 2,975,401 | 3/1961 | Shupe | 340/431 |
| 3,670,438 | 10/1972 | Carroll et al. | 40/129 C |
| 3,975,708 | 8/1976 | Lusk et al. | 340/686 |
| 4,114,299 | 9/1978 | Brownlee | 40/545 |
| 4,756,106 | 7/1988 | Foster | 40/591 |
| 4,806,476 | 8/1989 | Hall | 40/593 |
| 4,859,982 | 8/1989 | Seaburg | 340/475 |

*Primary Examiner*—Donnie L. Crosland
*Attorney, Agent, or Firm*—Albert E. Chrow

[57] ABSTRACT

A wireless taillight system is provided having a taillight module (150) removably mountable on a vehicle such as a wagon (125) being pulled by a farm tractor (100). Module (150) has at least one signal lamp illuminable by a wireless control signal transmitter module (200) having a power source carried thereby that along with module (150) is preferably operable to transmit a feedback signal to transmitter module (200) to provide the operator with information concerning one or more of: (i) the condition of the signal lamp; (ii) the condition of the power source powering the signal lamp and; (iii) whether a function selected by an operator has in fact occurred.

18 Claims, 3 Drawing Sheets

WIRELESS TAILLIGHT SYSTEM

INTRODUCTION

This invention relates generally to a wireless taillight system including a taillight module that can be removably mounted on a vehicle whose own taillight system is disabled or a vehicle being towed whose own taillight system is disabled or on mobile vehicles such as horse drawn buggies or farm equipment such as tractors pulling various wagons and farm implements that are not normally provided with taillight systems as part of the original equipment and more particularly to where the taillight module is controlled by a portable transmitter module having a self-contained power source carried thereby and where both modules are completely independent from the vehicle.

BACKGROUND OF THE INVENTION

There has long been a need to provide a wireless taillight system that can provide enhanced visibility to vehicles and towed vehicles while operating on public highways. Tractors pulling wagons and other farm implements that are not generally equipped with taillight systems represent a significant hazard when used on public highways because of their relative slow speed and the lack of taillight signaling systems. Many farm tractors in use today are not equipped with taillight systems and those that are would need a connector and wiring to the pulled farm wagon or implement that also are not generally equipped with taillight systems. The reliability of such hard-wired connections is very poor in what is normally a corrosive and physically demanding farm environment.

The wireless taillight system of the present invention is operative to provide a taillight module that can be easily and removably mounted to the towed wagon or implement and be remotely controlled by a transmitter module that is completely independent from the vehicle. In the preferred embodiment of this invention, the taillight module is operative to provide remote transmitted feedback signals to the transmitter to provide the user with confirmation that the various taillight functions have been activated and are working as well as low power source conditions that may exist in the taillight module to provide the user with a warning that taillight functionality may be interrupted to again provide enhanced reliability to the user.

Although a variety of systems have been devised in the past to provide vehicles with various types of message systems they have generally been (i) hardwired to a power source or utilized a battery and incapable of being operated remotely by the operator such as disclosed in U.S. Pat. Nos. 2,752,640; 2,813,265; 2,843,952; 4,860,476, the disclosures of which are incorporated by reference or, (ii) in the form of sticker type messages such as disclosed in U.S. Pat. No. 4,756,106, the disclosure of which is incorporated herein by reference or, (iii) in the form of illuminescent symbols or letters such as disclosed in U.S. Pat. No. 3,670,438, the disclosure of which is incorporated herein by reference or, (iv) in the form of an indicia display panel illuminated by a fluorescent light tube having one end engaged with an antenna supporting the display which is lighted when the antenna receives radio frequency from a CB radio such as disclosed in U.S. Pat. No. 4,114,299, the disclosure of which is incorporated herein by reference, or (v) in the form of a taillight module removably mounted on a vehicle in tow that is remotely operated by a radio frequency transmitter that is hardwired to the taillight system of the towing vehicle such as described in U.S. Pat. No. 4,859,982, the disclosure of which is incorporated herein by reference.

Not until the present invention has there been provided a taillight module that can be removably mounted on a vehicle and able to be remotely controlled by a wireless control signal transmitted by a portable transmitter module that is completely independent from the vehicle and which of great advantage for use in connection with mobile farm vehicles such as tractors or on horse drawn buggies or other vehicles not ordinarily provided with taillight systems.

SUMMARY OF THE INVENTION

Accordingly, it is an object of this invention to provide a wireless taillight system.

It is another object of this invention to provide a wireless taillight system having a taillight module that can be removably mounted to a vehicle and remotely controlled by a portable transmitter completely independent from the vehicle.

DESCRIPTION OF SOME PREFERRED EMBODIMENTS

Figure 1:
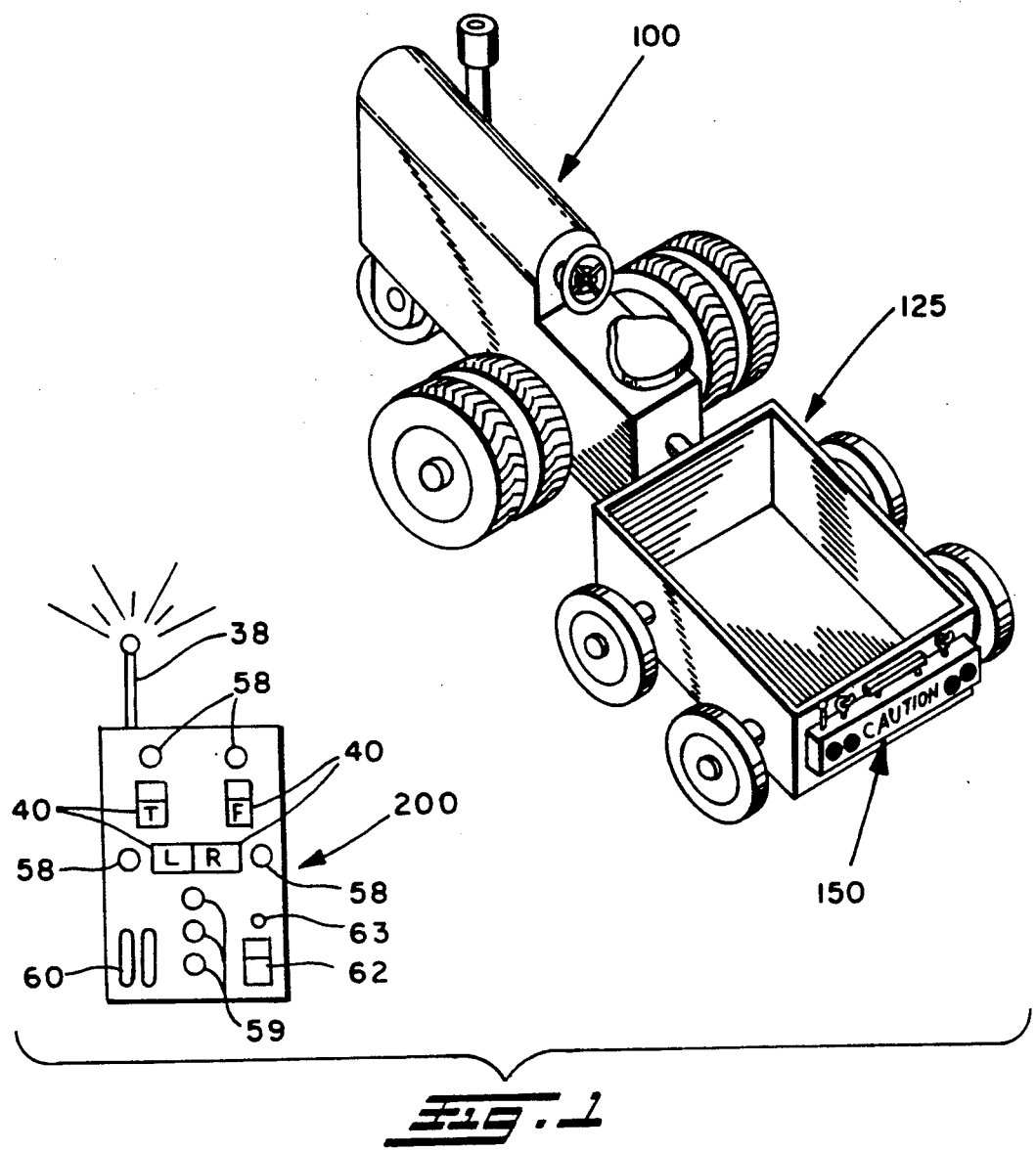
FIG. 1 is a perspective view of a farm tractor 100 pulling a wagon 125 that is carrying a removably mounted taillight module 150 that is remotely controlled by portable transmitter module 200.

A preferred embodiment of a taillight module 150 of the wireless taillight system of the invention is shown removably mounted to the back of a wagon 125 being pulled by a farm tractor 100. Also shown in FIG. 1 as part of the wireless taillight system of the invention is portable transmitter module 200 that is able to remotely control the operation of taillight module 150 with no physical connection between the two. Taillight module 150 is hereinafter more fully described with respect to FIGS. 2 and 3 and transmitter module 200 is herein more fully described with respect to FIG. 4. Components of transmitter module 200 such as antenna 38, LED lamps 58 and 59, "on-off" switch 62, switches 40 and vent openings 60 for audible signals are hereinafter described in greater detail with respect to FIG. 4. Understandably, the arrangement of switches, LEDs and sound vents and the like shown in FIG. 1 for transmitter module 200 is for illustrative purposes only for any arrangement of those functions shown in FIG. 1 may be employed as well as for deleting or adding additional functions as may be required as is well known to those skilled in the art.

Tractor 100 is exemplary of a vehicle that is occasionally required to travel on roads or highways, yet ordinarily has no taillight system provided as part of the original equipment. Although it has heretofor been the practice by some to place stick-on type warning messages on the back of tractors or on farm equipment such as wagon 125 being pulled by tractors and other vehicles not having an illuminable taillight system, such cannot in any manner, particularly during the evening and nighttime, be as effective as the illuminable wireless taillight system of the present invention.

Figure 2:
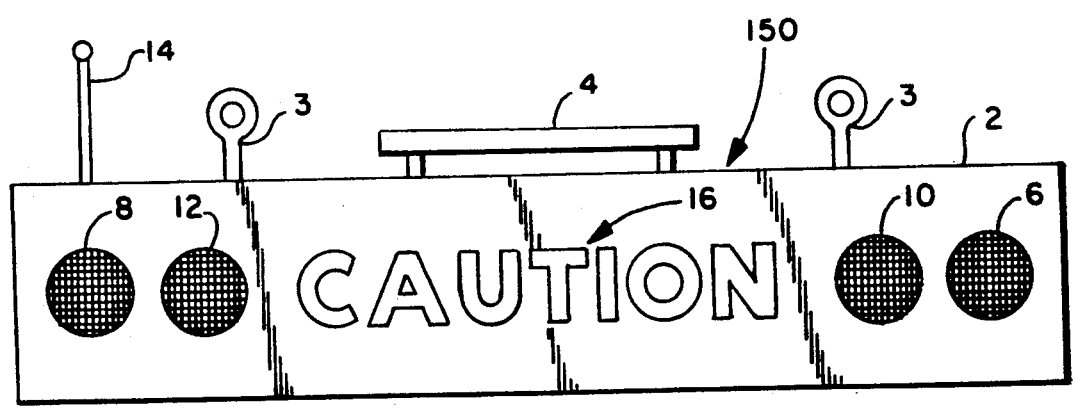
FIG. 2 is a front view of taillight module 150 of FIG. 1.

Taillight module 150 in FIG. 2 shows a preferred display arrangement featuring four signal lamps 6, 8, 10, 12 and a message 16 in the form of the word "CAUTION".

Taillight module 150 has a housing 2 that may be made of metal and/or plastic material or composite material suitable for conditions involved in particular applications. Although housing 2 may have any configuration that does not hinder its purpose and ability to be removably mounted to a vehicle, it preferably has a rectangular configuration such as shown in FIG. 2. The electrical components shown in FIG. 2 are suitably arranged within housing 2 and then preferably covered by a removable cover plate (not shown) preferably having suitable vent openings. Although antenna 14B is shown exposed in FIG. 2, such is for illustrative purposes only, for it along with antenna 14A hereinafter described with respect to FIG. 3 may be contained within housing 2 in the form of a simple antenna wire or the like when the transmitting distance between taillight module 150 and transmitter module 200 is to be maintained less than some predetermined minimum distance.

Housing 2 may include a handle such as handle 4 to facilitate carrying taillight module 2 from one location to another and may also include hanger elements such as eyelets 3 through which hooks or the like can extend to support it on a vehicle such as on wagon 125 shown in FIG. 1.

Since any suitable way for removably mounting taillight module 150 to a vehicle may be employed, such is not shown in the drawings. One method may be to employ spaced openings or T-slots in the back of housing 2 that are adapted to receive pins, lugs, bolts or hooks or other protuberances extending from the vehicle for supporting taillight module 150. Likewise, taillight module 150 may be secured to the vehicle by means of screws or bolts or straps or by means of adhesive strips or even magnetically as long as the associated magnetic field does not interfere with the operation of taillight module 150.

As previously described, the display arrangement shown in FIG. 2 is a preferred embodiment featuring spaced-apart right turn signal lamp 6 and left turn signal lamp 8 respectively disposed near opposite ends of housing 2 so as to emphasize the information received by a person viewing taillight module 150 that either a right turn or a left turn is being made when either is selectively illuminated.

Additional signal lamps such as signal lamps 10 and 12 are preferably included for purposes of providing emergency flashers for complementing a turning condition by providing a braking simulation as hereinafter described.

Additional signal lamp 10 is preferably located adjacent to right turn signal lamp 6 and additional signal lamp 12 is preferably located adjacent left turn signal lamp 8 as shown in FIG. 2. To emphasize their effectiveness, left turn signal lamp 8 and right turn signal lamp 6 and additional signal lamps 10 and 12 preferably have or are covered by a red lens so that when used in various combinations they become highly visible to a viewer when illuminated.

Although the word "CAUTION" is shown as message 16 between signal lamp 10 and 12, any desired message or messages such as "VEHICLE IN TOW"; "OVERSIZE LOAD"; or "SLOW-MOVING" may be located at one or more other locations on the face of the taillight module being viewed or in some instances the message may be completely omitted.

Although preferably illuminable by means of one or more additional signal lamps (not shown in FIG. 2), message 16 may be made colored strips or from a luminescent material illuminable by impinging light when suitable for the particular purpose intended.

Taillight module 150 may, in its more simple form, comprise as little as a single illuminable signal lamp that is adapted to be remotely selectively illuminated by actuation of a switch on transmitter 200 to provide information such as a message concerning a warning or condition of the vehicle desired to be imparted to a viewer. Preferably taillight module 150 includes at least one additional illuminable signal lamp and more preferably at least two additional signal lamps such as referenced by numerals 10 and 12 that are preferably disposed in spaced-apart relationship between signal lamps 6 and 8 such as shown in FIG. 2.

Figure 4:
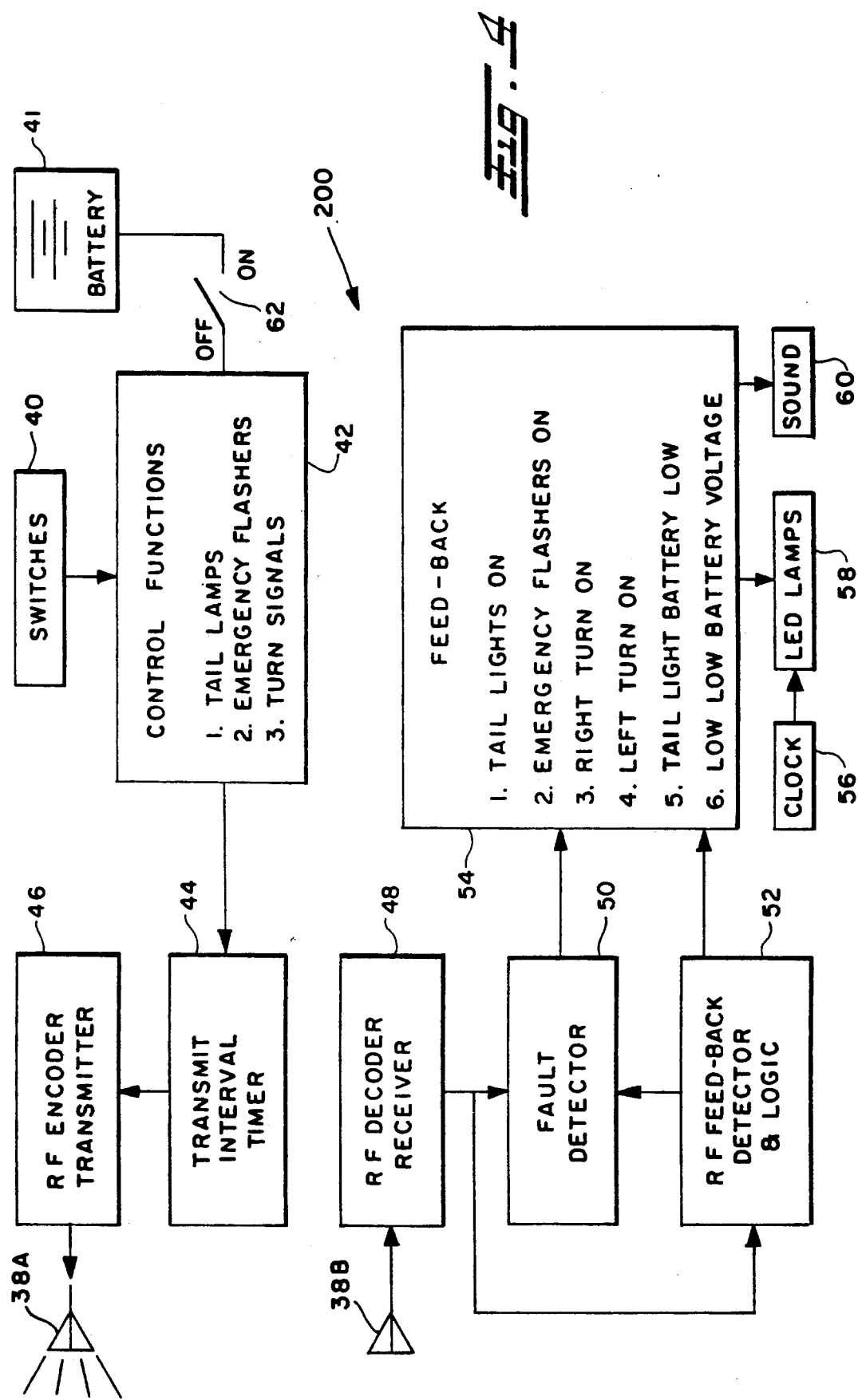
FIG. 4 is a block diagram of various electrical components contained in transmitter module 200.

The selective illumination of signal lamps 6, 8, 10 and 12 singularly and/or in selected combinations is controlled remotely by switches 40 on portable transmitter module 200 shown in FIGS. 1 and 4.

For example, electrical components and their associated inter-connecting circuitry within each of taillight module 150 and transmitter module 200 can be devised so that all of signal lamps 6,8, 10 and 12 as well as message 16 can be programmed to be simultaneously illuminated at predetermined intensity (candle power) to act as a general taillight system as the vehicle moves along the road or highway.

Right turn signal lamp 6 and left turn signal lamp 8 can be programmed to act either independently or in unison with additional signal lamps 10 and 12 respectively adjacent thereto.

Turn signal lamps 6 and 8 and/or additional signal lamps 10 and 12 can be programmed to act independently or in unison with each other to provide a constant illuminated signal or a flashing signal when desired.

Signal lamps 6, 8 10 and 12 can also be programmed to provide a braking simulation such that, when either or both adjacent signal lamps 6 and 10 are intermittantly illuminated (flashing) to provide a right turn signal, the intensity of illumination of either or both of lamps 8 and 12 is increased to simulate a braking action of slowing down for the right turn. This is also true for the signal lamp involved in the left turn process. It is generally preferred that, when a right turn is selected, both signal lamps 6 and 10 will flash and signal lamps 8 and 12 will brighten to simulate a braking action and vice-versa for a left hand turn.

The above described methods by which to convey information to a viewer can range from illumination of a single lamp or message to complex braking simulation all of which can be controlled remotely by a portable transmitter module that has no connection to the vehicle (tractor 100 and wagon 125 in FIG. 1) other than through a wireless signal when activated by an operator.

Figure 3:
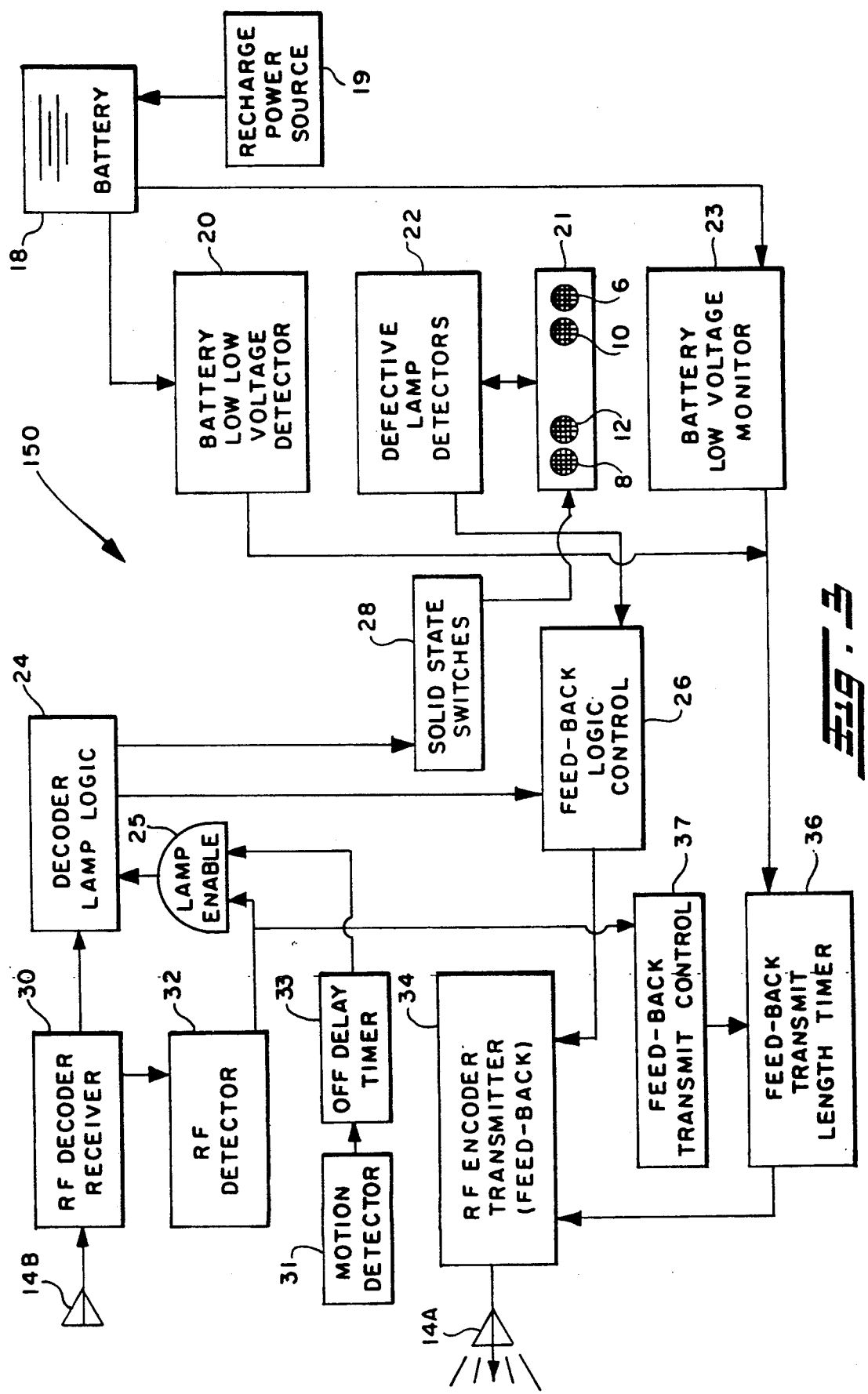
FIG. 3 is a block diagram of various electrical components contained in taillight module 150.

An embodiment of preferred components and their interconnecting circuitry for taillight module 150 is shown in FIG. 3.

Although taillight module 150 may be limited to act as a receiver only in providing visual information in response to receipt of a wireless control signal selected by actuating a particular switch or switches in transmitter module 200, it preferably is operative to act as both a receiver and a transmitter such that it has the ability to transmit a wireless feed-back signal back to transmitter module 200 to provide information concerning the condition of the signal lamps and/or power source on taillight module 150 and or whether a selected function has been successfully activated.

More particularly, taillight module 150 receives the wireless control signal, preferably a radio frequency signal commonly at about 300 Mega Hertz through antenna 14B. The signal is then conveyed from antenna 14B to an RF decoder referenced by numeral 30 after which the decoded signal is conveyed directly to a lamp/logic decoder referenced by numeral 24 and also indirectly to decoder 24 after having been processed by an RF detector referenced by numeral 32. Decoder 24 determines which of one or more of signal lamps 6, 8, 10 and 12 referenced by numeral 21 are to be illuminated and effects their respective illumination by selectively activating solid state switches referenced by numeral 28.

The feed-back signal components on taillight module 150 include defective lamp detectors referenced by numeral 22 that convey information concerning the condition of lamps 6, 8, 10 and 12 to the feed-back logic control referenced by numeral 26 which is then conveyed to antenna 14A through an RF encoder-transmitter referenced by numeral 34 for wireless transmission to transmitter module 200.

The embodiment of taillight module 150 shown in FIG. 3 also includes feed-back components operative to provide a feed-back signal providing information concerning, for example, a condition of the power source powering taillight module 150 such as a low battery voltage when the power source is a battery such as referenced by numeral 18 in FIG. 2. In instances where at least one of the signal lamps being employed is a vehicle type 12

Taillight module 150 preferably further includes a motion detector referenced by numeral 31 that is operative to convey a signal through an off time delay timer 33 to the lamp enable circuity 25 when taillight module 150 has been motionless for a predetermined period of time such as from about 12 to about 20 hours. Motion detector 31 is of advantage in conserving power such that, when the off-delay timer indicates that taillight module 150 has been motionless for the predetermined period of time, the power source for module 150 is automatically shut down.

Taillight module 150 may also include signal lamp testing circuitry enabling one to check whether the signal lamps are operating properly.

A preferred manner by which motion sensor 31 operates is where module 150 must be tilted to enable re-activation and when the absence of both a control signal from transmitter 200 and a motionless taillight module 150 for about 12 hours will cause module 150 to completely shut down to conserve power.

In FIG. 4, the selected wireless control signal is transmitted by transmitter module 200 to taillight module 150 through antenna 38A and the feed-back signal is received from taillight module 150 through antenna 38B. As described earlier, the use of exposed antennas may not be required for certain applications particularly where the distance between taillight module 150 and transmitter module 200 is to be maintained below some predetermined minimum distance.

Although transmitter 200 is preferably always in an "on" condition enabling direct operation of function switches 40 shown in FIG. 1, it may have a switch such as referenced by numeral 62 enabling it to be switched to either an "off" or "on" condition if desired. volt, 32 candle power light, battery 18 is preferably a 12 volt DC battery that is even more preferably a rechargeable battery that is recharged by a charging system such as referenced by numeral 19. In such instance, battery charging terminals (preferably fuse protected) may be located on the outside of housing 2 for easy accessability to charge battery 18.

A low battery voltage monitor referenced by numeral 23 detects when the voltage of battery 18 drops below a level at which the battery must be recharged. Generally, the recharge level for a 12 volt DC battery is about 10.5 volts. The voltage of battery 18 monitored by monitor 23 is conveyed by signal to feed-back length timer 36 which changes the length of the feedback transmission, thereby indicating the low battery condition. The feed-back signal is continuously transmitted back to module 200 at a predetermined interval. The length of the transmission interval is the means whereby a low battery condition can be indicated.

The voltage of battery 18 is also preferably monitored by a low, low voltage monitor referenced by numeral 20 which caused it to again change the length of the feed-back transmission to indicate a low, low battery condition upon conveyance of the signal through feed-back logic control 26 to transmitter encoder 34 for wireless transmission to transmitter module 200 through antenna 14A. The pre-defined transmission length will be decoded by transmitter module 200 which is operative to illuminate a low voltage signal LED lamp advising the operator that battery voltage is low. For a 12 volt battery powering at least one 12 volt signal lamp, the low voltage LED lamp on transmitter 200 preferably lights when the voltage of battery 18 drops below about 11 volts.

Switches referenced by numeral 40 are activated by the operator to effect selected control functions such as for activating tail lamps or emergency flashers or turn signals by illuminating signal lamps contained on taillight module 150 either singularly or in selected combinations as previously described.

Transmitter module 200 is operative to transmit the encoded signals at time intervals determined by transmit interval timer 44. Such pulsed signals help conserve battery power and also create a period of time in which the feed-back signals from taillight module 150 can be received via encoder 34 without interference. Transmitter module 200 is preferably powered by a 9 volt DC power source referenced by numeral 41 and which is commonly employed for hand held transmitters.

The feed-back signal received through antenna 38B is conveyed to an RF decoder receiver referenced by numeral 48 The decoded signal is then conveyed to a feed-back detector/logic unit referenced by numeral 52 and to a fault detector referenced by numeral 50. Fault detector 50 measures the feed-back transmission length (in seconds). A fault is detected if the time equals or exceeds an already predetermined length of time such as where the feed-back transmission length of time for a low battery is about 0.75 second and for low low battery is about 1.0 second.

Control signal(s) from detector 50 and detector 52 activate LED lamp(s) referenced by numerals 58 and 59 corresponding to the particular function involved such as enumerated by numerals 1 through 6 in FIG. 4.

Referring back to FIG. 1, a preferred embodiment of the functional operation of transmitter 200 is where actuation of switch 40 marked with letter "T" results in the illumination of all of signal lamps 6, 8, 10 and 12 as well as the LED lamp 58 adjacent thereto on module 200 to indicate the function has occurred if not otherwise defective for one reason or another. Actuation of switch 40 marked with the letter "F" results in flashing illumination of all of signal lamps 6, 8, 10 and 12 in illumination of the LED lamp 58 adjacent thereto to indicate that the function has occurred if not otherwise defective for one reason or another. Actuation of the switch marked with the letter "L" causes lamp 8 and 12 to flash to indicate a left turn causes lamps 6 and 10 to brighten to simulate braking in addition to illumination of the LED lamps referenced by numeral 40 respectively adjacent thereto to indicate that the function has occurred if not otherwise defective for some reason or another.

Likewise, actuation of the switch marked with the letter "R" causes signal lamps 6 and 10 to flash to indicate a right turn while signal lamps 8 and 12 brighten to simulate braking and the LED lamp referenced by numeral 40 adjacent thereto illuminates to indicate that the function has occurred if not otherwise defective for one reason or another.

As shown in FIG. 1, transmitter module 200 preferably includes LED warning lamps referenced by numeral 59 that respectively illuminate in the event a function has not occurred such as where one of the LED lamps 59 will illuminate to provide a yellow light when the battery voltage in taillight module 150 is low and another of the LED lamps 59 will illuminate to provide a red light when the battery voltage on the taillight module 150 is low low and the third LED lamp 59 will illuminate in the event a function activated by one of the switches 40 on transmitter 200 fails to occur.

Another embodiment is where transmitter module 200 is provided with four LED's that respectively mirror the corresponding conditions of the lights on taillight module 150 so that the operator of transmitter module 200 will be able to visually discern the light conditions on taillight module 150 by viewing transmitter module 200.

One or more of LED lamps 58 and 59 may themselves be converted to a flashing signal by use of clock 56 if desired.

Transmitter 200 may also also include means for providing an audible (sound) signal emitted for a predetermined period of time through sound vents such as referenced by numeral 60. Such can be provided for example when switch 62 is turned to the "on" condition. Sound can also be employed in conjunction with or in lieu of the illumination of one or more of the LED lamps 58 and 59 and to indicate that the function has either been successful or has not been successful as the case may be.

It is to be understood that the wireless taillight system of the invention includes the ability to adjust the encoding of the control and feed-back signals so that a single transmitter module can be used to control more than one taillight module or in other instances, be matched to control only a singular taillight module as the case may be.

It is also to be understood that the term "wireless control signal" as used herein is not limited to radio signals but can be any type of wireless signal operative to convey information either or both as a transmitter signal and as a feed-back signal such as a sonic signal or ultra-sonic signal or a laser signal or a infra-red signal.

Although the present invention has been described herein with a certain degree of particularity, it is to be understood that the description herein is made by way of example only and that numerous changes in details of construction and combination of the parts may be resorted to without departing from the scope of the invention as hereinafter claimed.

What is claimed is:

1. A wireless taillight system comprising:
   a taillight module adapted to be removably mounted on a vehicle, said taillight module including at least one signal lamp selectively illuminable by an electrical power source to provide visual information concerning a particular condition of the vehicle and said taillight module including means for receiving a transmitted wireless control signal and for enabling the power source to illuminate the signal lamp upon receipt thereof;
   a portable transmitter module powered by a power source carried thereby independent from the vehicle, said transmitter module selectively operable by an operator to transmit the wireless control signal to the taillight module;
   said taillight module including means for transmitting a wireless feedback signal concerning one or more of: a condition of the taillight module signal lamp; a condition of the power source; and whether a function selected by the operator has occurred; and
   said transmitter module including means for receiving the feed-back signal and for providing information to the operator derived therefrom.

2. The taillight system of claim 1 wherein the taillight module signal lamp condition is a failure of the signal lamp to illuminate and the power source condition is a power level below a predetermined value.

3. The taillight system of claim 1 wherein the taillight module further includes a message illuminable by impinging light or upon receipt of a selected transmitted wireless control signal and the transmitter module includes means for selectively transmitting said control signal.

4. The taillight system of claim 1 wherein the feedback signal is a radio frequency feed-back signal.

5. The taillight system of claim 1 wherein the feedback signal is a selected one of a sonic signal, an ultra-sonic signal, a laser signal, and an infra-red signal.

6. The taillight system of claim 1 wherein the transmitter module has a selectable "off" and "on" condition and includes means for providing a visual signal when said module is in the "on" condition.

7. The taillight system of claim 1 wherein the transmitter module has a selectable "off" and "on" condition and includes means for providing an audible signal for a predetermined period of time when said module is in the "on" condition.

8. The taillight system of claim 1 wherein the transmitter module includes means for providing a visual signal upon activation of a selected function.

9. The taillight system of claim 1 wherein the transmitter module includes means for providing an audible signal for a predetermined period of time upon activation of a selected function.

10. The taillight system of claim 1 wherein the transmitted wireless control signal is an intermittent control signal.

11. The taillight system of claim 1 wherein the transmitter module includes means for providing a visual signal when the taillight module signal lamp fails to illuminate upon receipt of the selected control signal.

12. The taillight system of claim 3 wherein the transmitter module includes means for providing a visual signal when the message fails to illuminate upon receipt of the selected control signal.

13. The taillight system of claim 1 wherein the taillight module includes means for monitoring an absence time period for control signals received from the transmitter module and further includes means for turning off the signal lamp when the absence time period exceeds a predetermined value.

14. A wireless taillight system comprising:
a taillight module adapted to be removably mounted on a vehicle, said taillight module including at least one signal lamp selectively illuminable by an electrical power source to provide visual information concerning a particular condition of the vehicle, said taillight module including means for receiving a transmitted wireless control signal and for enabling the power source to illuminate the signal lamp upon receipt thereof, and said taillight module including means for transmitting a wireless feed-back signal concerning one or more of: a condition of the signal lamp; a condition of the power source; and whether a selected function has ocurred; and
a portable transmitter module powered by a power source carried thereby independent from the vehicle, said transmitter module selectively operable by an operator to transmit the wireless control signal to the taillight module, and said transmitter module including means for receiving the feed-back signal and for providing information to the operator concerning the condition of the signal lamp, the condition of the power source, and whether the selected function has been activated.

15. A wireless taillight system comprising:
a taillight module adapted to be removably mounted on a vehicle, said taillight module including;
a left turn signal lamp and a right signal lamp respectively disposed near opposite ends of the module,
an additional signal lamp disposed adjacent the right turn signal lamp and an additional signal lamp disposed adjacent the left turn signal lamp,
said signal lamps selectively illuminable singularly or in predetermined combinations by an electrical power source to provide visual information concerning a condition of the vehicle,
said taillight module including means for receiving a transmitted wireless control signal and for enabling the power source to illuminate the signal lamps upon receipt thereof,
said taillight module including means for transmitting a wireless feed-back signal concerning a condition of the signal lamps; a condition of the power source; and whether the selected function has been activated,
a portable transmitter module powered by a power source carried thereby independent from the vehicle, said transmitter module selectively operable by an operator to transmit the wireless control signal to the taillight module,
and said transmitter module including means for receiving the feed-back signal from the taillight module and for providing information concerning the condition of the signal lamps, the condition of the power source, and whether the selected function has occurred.

16. The taillight system of claim 14 or 15 wherein the taillight module further includes a message illuminable by impinging light or by the power source upon receipt of a selected wireless control signal and the transmitter module is operative to selectively provide said control signal.

17. The taillight system of claims 14 or 15 wherein the feedback signal is an intermittant signal.

18. The taillight system of claims 1, 14 or 15 wherein the taillight module includes a motion sensor operative to shut off the taillight module power source in the event the taillight module remains motionless for a predetermined period of time.

* * * * *